United States Patent [19]

Lazzari

[11] Patent Number: 4,949,207
[45] Date of Patent: Aug. 14, 1990

[54] PLANAR STRUCTURE THIN FILM MAGNETIC HEAD

[75] Inventor: Jean-Pierre Lazzari, Corenc, France

[73] Assignee: Commissariat a l'Energie Atomique, Paris, France

[21] Appl. No.: 384,112

[22] Filed: Jul. 21, 1989

Related U.S. Application Data

[60] Continuation of Ser. No. 304,232, Jan. 31, 1989, abandoned, which is a division of Ser. No. 94,292, Sep. 8, 1987, Pat. No. 4,837,924.

[30] Foreign Application Priority Data

Sep. 17, 1986 [FR] France .................................. 86 13010

[51] Int. Cl.⁵ ............................................ G11B 5/235
[52] U.S. Cl. ...................................... 360/119; 29/603; 360/120; 360/126
[58] Field of Search .................. 29/603; 360/119-121, 360/125-127

[56] References Cited

U.S. PATENT DOCUMENTS 4,601,099  7/1986  Nishiyama ............................. 29/603
4,639,289  1/1987  Lazzari ............................... 29/603 X

FOREIGN PATENT DOCUMENTS 0021938  2/1984  European Pat. Off. .

Primary Examiner—Carl E. Hall
Attorney, Agent, or Firm—Oblon, Spivak, McClelland, Maier & Neustadt

[57] ABSTRACT

A recess is etched in a substrate and is filled by a magnetic film. A coil is formed in an insulating film and magnetic contact pads are formed. Two magnetic films are formed in an insulating film and then in a hard film are formed two pole pieces separated by an amagnetic spacer.

2 Claims, 5 Drawing Sheets

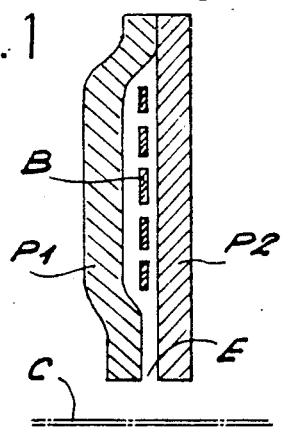
FIG. 1
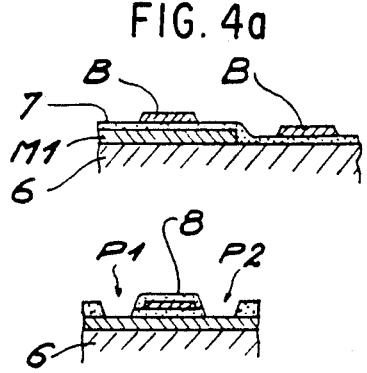
FIG. 4a
FIG. 4b
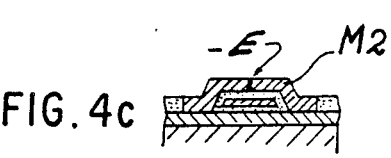
FIG. 4c
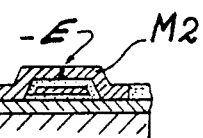
FIG. 4d
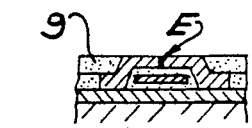
FIG. 4e
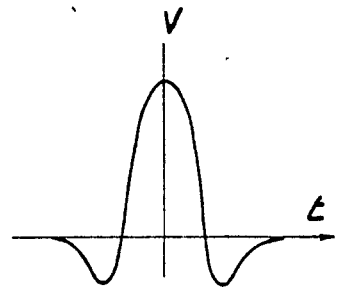
FIG. 2
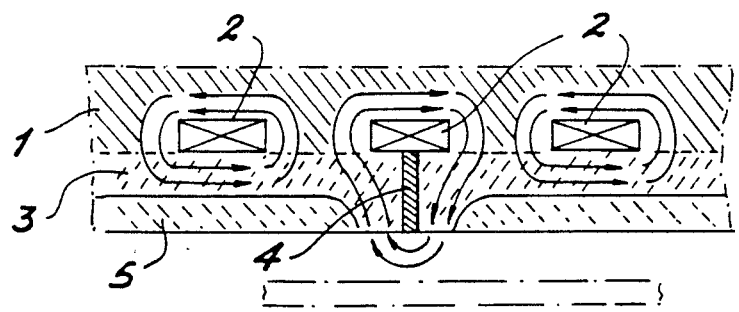
FIG. 3

PLANAR STRUCTURE THIN FILM MAGNETIC HEAD

This application is a continuation of abandoned application Ser. No. 07/304,232, filed Jan. 31, 1989 which in turn is a division of Ser. No. 94,292, filed Sept. 8, 1987, U.S. Pat. No. 4,837,924.

BACKGROUND OF THE INVENTION

The present invention relates to a process for the production of planar structure thin film magnetic heads and to a head obtained by this process.

Two types of thin film magnetic heads are known, namely those mounted perpendicular to the magnetic film to be read or recorded and those mounted parallel to said film.

FIG. 1 shows a head formed from two pole pieces P1 and P2 defining an air gap E, a coil B surrounding said pole pieces. The recording film C passes in front of air gap E. Such a head is described in Japan patent abstracts, vol. 5, No. 150, P-81, 822 of 22.9.1981.

The field gradient produced by such a head is high and produces intense demagnetizing fields in the recording film, which makes writing difficult. Moreover, on reading, a signal V is obtained like that of FIG. 2. Perpendicular to the external angles of the pole pieces voltage polarity reversals appear, which leads to serious problems in connection with the processing of the information read.

For these reasons, preference is given to the use of horizontally mounted heads, like that shown in FIG. 3. Such a head is described in European patent application 85400136.9, published under No. 0 152 326. It is possible to see a first magnetic film 1, in which is formed a coil 2 and a second magnetic film 3 subdivided into two parts by an amagnetic spacer 4. A hard film 5 protects the assembly and ensures the planarity of the film.

FIG. 4 illustrates a known process for the production of a horizontal head. This process is produced in Japan patent abstracts, vol. 5, No. 5, P-44, 677, of 14.1.1981. On a substrate 6 is deposited a first magnetic film M1, followed by an insulating film 7 and a coil B (part a). This is followed by the depositing of an insulating film 8 and the etching of two wells P1, P2 (part b). This is followed by the deposition of a second magnetic film M2, which comes into contact with the first as a result of the two wells P1 and P2 (part c). This is followed by the formation of an air gap, the deposition of a glass layer (part d) and the planification of the assembly (part e).

Although satisfactory in certain respects, these prior art processes and means suffer from disadvantages. In the case of the head of FIG. 3, there are still outer ends of pole pieces which can lead to reversing of the reading signal. In the process illustrated in FIG. 4, the fineness or thinness of the end of the pole pieces is avoided, but the air gap is open and relatively wide, being gradually filled with magnetic particles, which magnetically short-circuit the head. Finally, the magnetic flux produced by the coil follows a quasi-constant section circuit and consequently there is no flux concentration at the air gap. Moreover, in the process of FIG. 4, coil B is not in a single plane, instead being in two separate planes, one corresponding to the central part above the first pole piece and another lower plane corresponding to the two side parts (only one of which is shown to the right in FIG. 4, i.e. part a). The lateral parts make it possible to close the winding around the pole pieces. Moreover, it can be seen that pole piece M1 is not buried in the substrate 6, which leads to a head having a large relief. Finally, the parts of the pole piece M2 not covered by the protective film 9 are very wide (because they are substantially as wide as the coil), which makes the head very fragile.

SUMMARY OF THE INVENTION

The object of the present invention is to obviate these disadvantages. It therefore proposes a production process making it possible to obtain a narrow air gap formed from an amagnetic film and pole pieces such that a flux concentration occurs in the vicinity of the air gap and giving only a small unprotected surface. Moreover, the inventive process makes it possible to obtain a structure buried or embedded in a substrate, i.e. without relief. It can also be added that the inventive process does not require the final polishing operation required by the prior art process.

The inventive process involves conventional thin film deposition and etching operations in connection with the technology of integrated circuits, as well as electrolytic deposition operations with respect to the various magnetic films.

The invention also relates to a magnetic head obtained by the inventive process.

BRIEF DESCRIPTION OF THE DRAWINGS

The invention is described in greater detail hereinafter relative to non-limiting embodiments and the attached drawings, wherein show:

FIG. 1, already described, a vertically mounted known magnetic head.

FIG. 2, already described, the configuration of the signal obtained by the preceding head.

FIG. 3, already described, a known horizontally mounted magnetic head.

FIG. 4, already described, a known process for producing a horizontal head.

FIG. 5 13 stages (a to m) of the production process according to the invention.

DETAILED DESCRIPTION OF THE PREFERRED EMBODIMENTS

Figure 5:
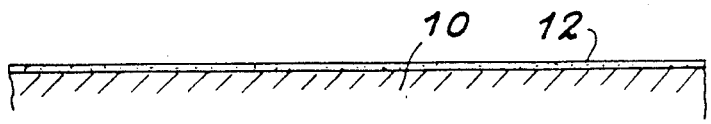
Figure 5:
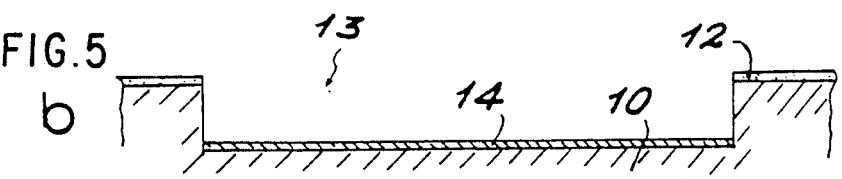
Figure 5:
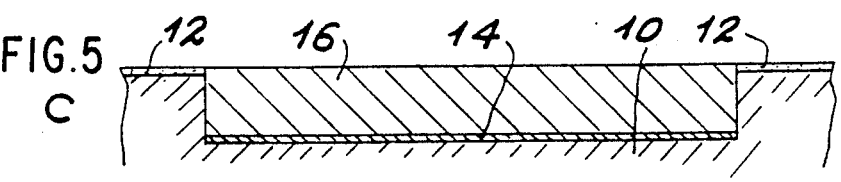
Figure 5:
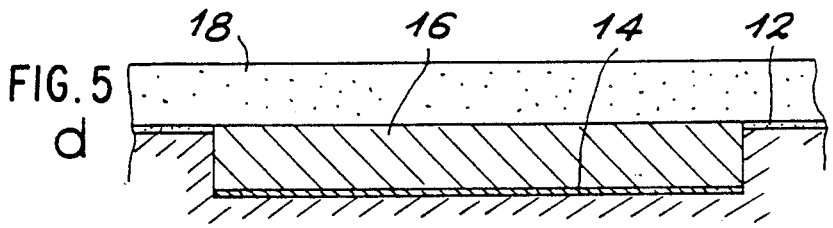
Figure 5:
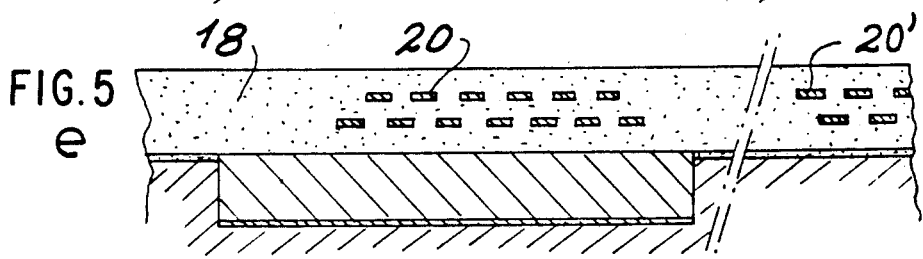
Figure 5:
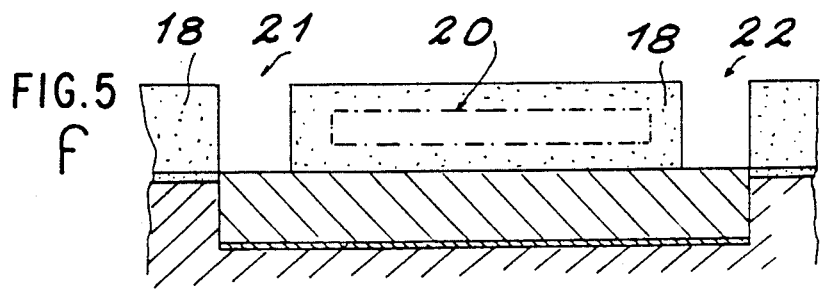
Figure 5:
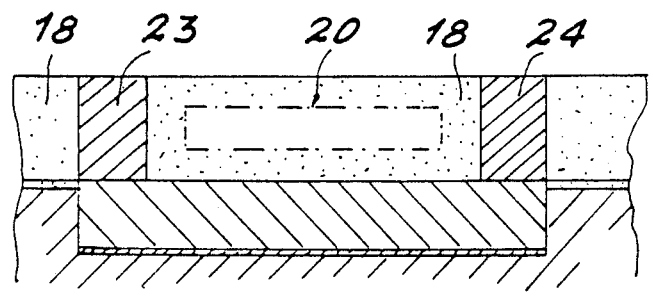
Figure 5:
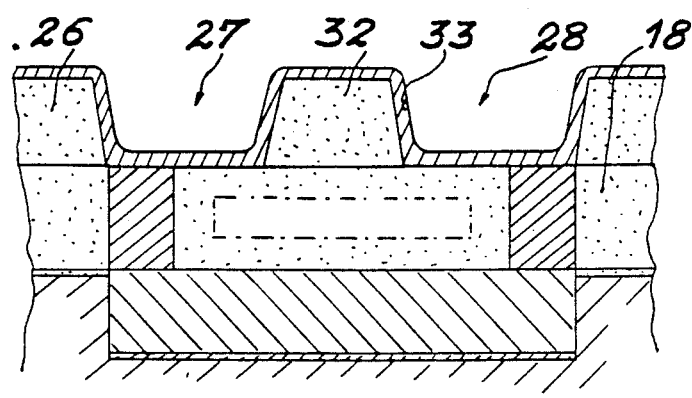
Figure 5:
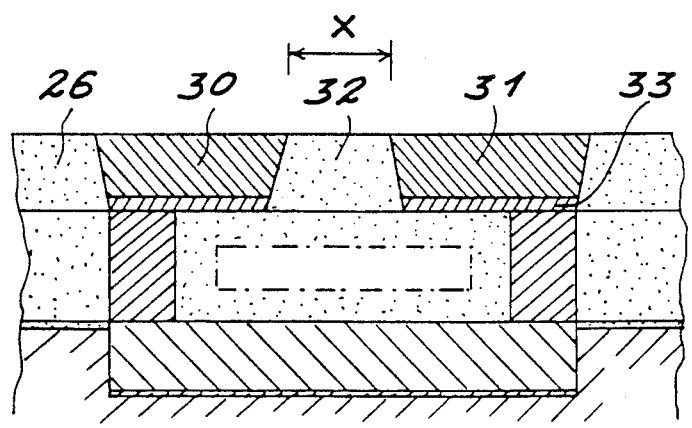
Figure 5:
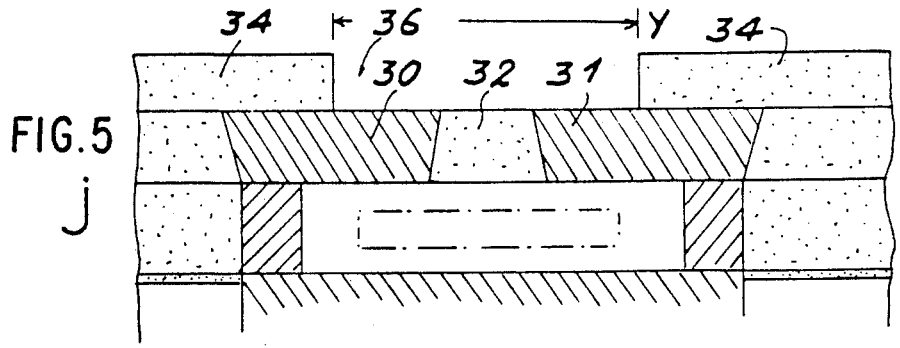
Figure 5:
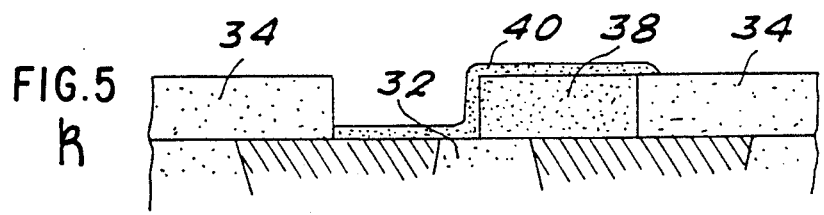
Figure 5:
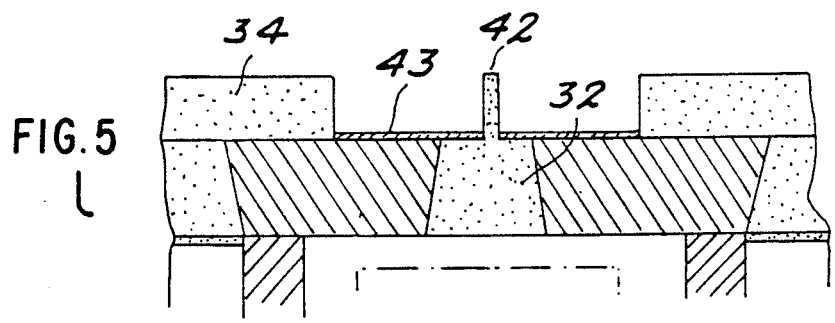
Figure 5:
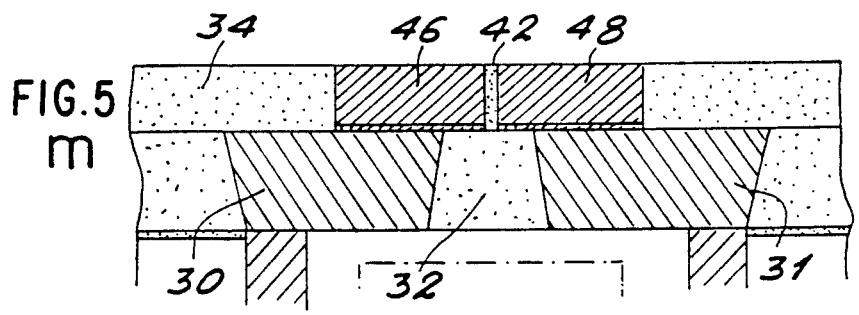

FIG. 5 shows the main stages of the inventive process. The invention involves the following operations. On an e.g. silicon insulating substrate 10 is formed a first insulating film 12 (e.g. of silicon oxide constituting part a). Insulating film 12 and substrate 10 are etched to form a first recess 13 (part b). On the entity is deposited a first conductive film 14, which is then selectively etched in such a way that it only remains at the bottom of the first recess 15 (part b). By a first electrolysis using conductive film 14 as the electrode, a first magnetic film 16 is deposited which fills the recess 13, said first magnetic film 16 being level with the surface of the first insulating film 12 (part c). Thus, said magnetic film is buried or embedded in the substrate.

On the entity is deposited a second insulating film 18 (part d). In said second insulating film 18 is formed an electric coil 20 (part e). Such an operation is described in the aforementioned European patent application (FIGS. 3 and 4 thereof). This coil is closed by side parts (only one being shown) 20', which are in the same plane as the central part 20. On either side of the coil 20, two openings 21, 22 are etched in the second insulating film 18 and they reach the first magnetic film 16 (part f).

By a second electrolysis using the first conductive film 14 as the electrode, these openings are filled to constitute magnetic contact pads 23, 24, which are in good magnetic continuity with the first magnetic film 16 and are level with the second insulating film 18 (part g). On the entity is deposited a third insulating film 26 (part h), e.g. of $SiO_2$, $Al_2O_3$, polyimide resin, etc. Second and third recesses 27, 28 are etched in said third insulating film 26 above the magnetic contact pads 23, 24 leaving between the second and third recesses a central insulating island 32 (part h). On the entity is deposited a second conductive film 33, which is then selectively etched so as to only leave it at the bottom of the second and third recesses 27, 28 (part h).

By a third electrolysis using the second conductive film 33 as the electrode, the second and third recesses are filled by a second magnetic film subdivided into two parts 30, 31 and located on either side of the central insulating island 32, said film being level with the surface of the third insulating film 26 (part i). On the entity is deposited a fourth hard protective insulating film 34 (part j). In said fourth recess 36 is produced a thin amagnetic spacer centered on the central insulating island 32. Such a spacer can be obtained in the manner described in the aforementioned European patent application by the deposition of an insulant 38, etching of the latter to give it the shape of a step, deposition of an amagnetic film 40 (part k), etching horizontal portions and maintaining the vertical wall 42 (part l). On the entity is deposited a third conductive film 43, which is then selectively etched so as to only leave it at the bottom of the fourth recess 36 on either side of spacer 42 (part l).

By a fourth electrolysis taking the third conductive film 43 as the electrode, the fourth recess 36 is filled by a third magnetic film subdivided into two parts 46, 48 located on either side of amagnetic spacer 42, said third magnetic film being level with the surface of the hard protective film 34 (part m). There is consequently no need to polish the part as in the prior art.

In this process, the conductive films 14, 33, 43 can e.g. be of copper, chromium or tungsten. The magnetic films 16, 23, 24, 30, 31, 46, 48 can be of Fe:Ni in a ratio of e.g. 80:20 in order to obtain a high magnetic permeability. The thickness of magnetic film 16 can be 1 to 5 $\mu m$. The vertical wall 42 can have a width between 0.05 and 1 $\mu m$. The width X of the central contact pad 32 (part i) is between 1 and 5 $\mu m$. The thickness of hard film 34 can be between 1 and 5 $\mu m$. The etching width Y is between 5 and 15 $\mu m$ (part j).

Figure 6:
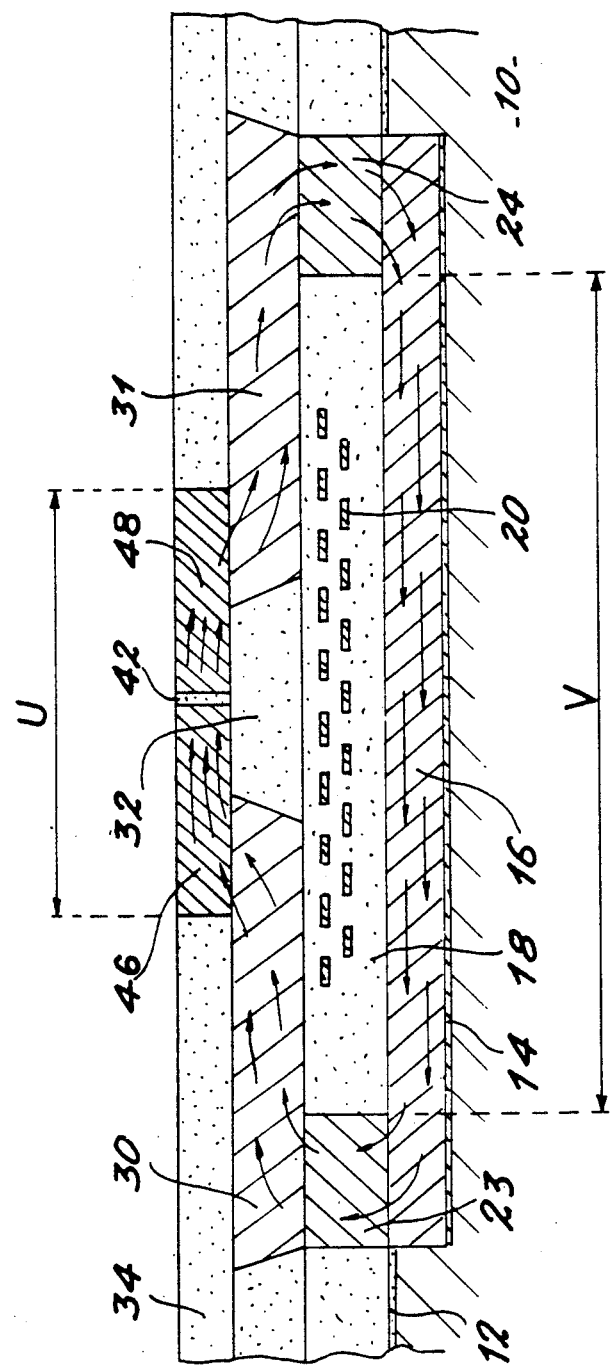
FIG. 6 The magnetic head which is obtained.

In section, FIG. 6 shows the complete head obtained, with the magnetic field lines making it possible to distinguish the concentration of the flux close to the air gap. The width U of parts 46 and 48 is approximately 10 $\mu m$, whereas coil 18 has a width between 120 and 200 $\mu m$. Thus, the unprotected part of the pole pieces is very narrow.

What is claimed is:

1. A planar structure thin film magnetic head, obtained by a process which comprises:
   forming a first insulating film on an insulating substrate,
   etching the insulating film and the substrate to form a first recess,
   depositing thereon a first conductive film, which is then selectively etched in such a way that it only remains at the bottom of the first recess,
   depositing a first magnetic film by a first electrolysis taking the conductive film as the electrode so that said first magnetic film fills the recess and is level with the surface of the first insulating film,
   depositing a second insulating film thereon wherein an electric coil is formed in said second insulating film,
   etching in the second insulating film, on either side of the coil, two openings reaching the first magnetic film,
   filling said openings by a second electrolysis using the first conductive film as the electrode, to thereby produce magnetic contact pads, which have a good magnetic continuity with the first magnetic film and are level with the surface of the second insulating film,
   depositing thereon a third insulating film,
   etching in said third insulating film, above the magnetic contact pads, second and third recesses, leaving between said second and third recesses a central insulating island,
   depositing thereon a second conductive film, which is then selectively etched so as to leave it at the bottom of the second and third recesses,
   filling the second and third recesses with a second magnetic film subdivided into two parts and located on either side of the central insulating island, said second magnetic film being level with the surface of the third insulating film, by a third electrolysis using the second conductive film as the electrode,
   depositing thereon a fourth hard protective insulating film, into which is etched a fourth recess above the central insulating island and reaching the second magnetic film,
   forming in said fourth recess a thin amagnetic spacer centered on the central insulating island,
   depositing thereon a third conductive film, which is then selectively etched so as to only leave it at the bottom of the fourth recess on either side of the spacer,
   filling the fourth recess with a third magnetic film subdivided into two parts located on either side of the amagnetic spacer, said third magnetic film being level with the surface of the hard protective film, by a fourth electrolysis using the third conductive film as the electrode; wherein said planar structure thin film magnetic head comprises an insulating substrate, a first magnetic film buried in the substrate and level with the surface thereof, two magnetic contact pads resting at the two ends of the first magnetic film, an electric coil located in an insulating film and surrounding the two contact pads, an insulating island positioned above the central part of the coil, a second magnetic film subdivided into two portions by the insulating contact pad and a third magnetic film subdivided into two parts resting on the two portions of the second magnetic film, said two portions being separated by an amagnetic spacer, said third film being buried in a hard protective insulating film.

2. A planar structure thin film magnetic head, which comprises:
   (i) a first layer having; an insulating substrate having a top surface and a first magnetic film buried in the substrate from the top surface thereof such that an exposed surface of the magnetic film is level with the top surface of the substrate;

(ii) a second layer overlying said first layer having; a second insulating film in overlying contact with the exposed surface of said first magnetic film and leaving said first magnetic film exposed at each end of the second insulating film, said second insulating film having an electrical coil located therein and two magnetic contact pads in overlying contact with the exposed surface of the first magnetic film at the ends of the second insulating film and in contact with second insulating film;

(iii) a third layer overlying said second layer and having; a central insulating island and two second magnetic film portions in overlying contact with and completely covering said second insulating film and said contact pads such that said central insulating island is in contact with the second insulating film at a central portion thereof thereby leaving the surface of the second insulating film on either side of the insulating island uncovered and each of said second magnetic film portions in overlying contact with a respective one of the uncovered surfaces of the second insulating film and a contact pad contiguous to that uncovered portion of the second insulating film; and (iv) a fourth layer overlying said third layer and having; a third magnetic film, subdivided and separated into two parts by an amagnetic spacer, in overlying contact with said insulating island, said two parts each overlying and contacting a respective one of said second magnetic film portions, and a hard protective insulating film in contact with the subdivided third magnetic film and covering all portions of the third layer not covered by said subdivided third magnetic film and said amagnetic spacer.

* * * * *